(12) United States Patent
O'Connor (10) Patent No.: US 8,819,987 B2
(45) Date of Patent: Sep. 2, 2014

(54) MUSHROOM PRODUCTION PROCESS

(75) Inventor: John O'Connor, County Limerick (IE)

(73) Assignee: Biomass Heating Solutions Limited, County Limerick (IE)

(*) Notice: Subject to any disclaimer, the term of this patent is extended or adjusted under 35 U.S.C. 154(b) by 523 days.

(21) Appl. No.: 13/130,389

(22) PCT Filed: Oct. 2, 2009

(86) PCT No.: PCT/EP2009/062864
§ 371 (c)(1),
(2), (4) Date: Sep. 7, 2011

(87) PCT Pub. No.: WO2010/057716
PCT Pub. Date: May 27, 2010

(65) Prior Publication Data
US 2011/0308148 A1 Dec. 22, 2011

(30) Foreign Application Priority Data
Nov. 20, 2008 (IE) .................................... 2008/0927

(51) Int. Cl.
*A01G 1/04* (2006.01)
(52) U.S. Cl.
USPC ............................................................ 47/1.1
(58) Field of Classification Search
CPC .................................. A01G 1/04; A01G 1/044
USPC ........ 47/1.1, 48.5, 58.1 R, 58.1 SC, 60; 71/5, 71/8–10; 237/13, 81; 60/641.1
See application file for complete search history.

(56) References Cited

U.S. PATENT DOCUMENTS

| 2,592,711 A | * | 4/1952 | Knaust et al. ........................ 71/5 |
| 4,261,137 A | * | 4/1981 | Primus ............................. 47/1.1 |
| 4,461,606 A | | 7/1984 | Cormack |
| 4,462,341 A | | 7/1984 | Strohmeyer, Jr. |
| 5,129,993 A | * | 7/1992 | Bleeker ....................... 159/47.3 |

(Continued)

FOREIGN PATENT DOCUMENTS

| DE | 975727 C | 6/1962 |
| DE | 2744684 A1 | 4/1979 |

(Continued)

OTHER PUBLICATIONS

English translation of abstract of (German language) EP 0063173, 1 page.

(Continued)

*Primary Examiner* — Isam Alsomiri
*Assistant Examiner* — Ebony Evans
(74) *Attorney, Agent, or Firm* — Brian J. Colandreo; Michael T. Abramson; Holland & Knight, LLP (57) ABSTRACT

The present invention relates to a mushroom production process comprising the steps of preparing a mushroom growing shed with at least one bed of mushroom compost; supplying heat to the mushroom growing shed; harvesting the mushrooms; and removing the spent mushroom compost from the mushroom growing shed; wherein the process further comprises the steps of combusting the spent mushroom compost in an energy conversion system; harnessing the heat generated by combusting the spent mushroom compost; and using the harnessed heat to control temperature of the mushroom growing shed. In this way, the energy costs for the mushroom production are greatly reduced.

21 Claims, 8 Drawing Sheets

(56) References Cited

U.S. PATENT DOCUMENTS

| | | | |
|---|---|---|---|
| 5,305,713 | A | 4/1994 | Vadakin |
| 5,425,331 | A | 6/1995 | Abdulally |
| 5,563,803 | A | 10/1996 | Morihara et al. |
| 5,620,488 | A | 4/1997 | Hirayama et al. |
| 5,743,197 | A | 4/1998 | Kinni et al. |
| 6,176,188 | B1 * | 1/2001 | Stevers et al. ............... 110/345 |
| 7,891,114 | B2 * | 2/2011 | Lasonde ...................... 34/331 |
| 2006/0104872 | A1 | 5/2006 | Ishikawa et al. |
| 2006/0236906 | A1 | 10/2006 | Buhr et al. |
| 2007/0012045 | A1 | 1/2007 | Chandran et al. |

FOREIGN PATENT DOCUMENTS

| | | | |
|---|---|---|---|
| DE | 4008287 | A1 | 9/1991 |
| DE | 102006004222 | A1 | 8/2007 |
| EP | 0063173 | A1 | 10/1982 |
| EP | 0202215 | A2 | 11/1986 |
| EP | 0305857 | A2 | 3/1989 |
| EP | 0509684 | A2 | 10/1992 |
| EP | 1182248 | A1 | 2/2002 |
| EP | 1245143 | A1 | 10/2002 |
| GB | 2073771 | A | 10/1981 |
| GB | 2148734 | A | 6/1985 |
| JP | 61183194 | A | 8/1986 |
| WO | 9810037 | A1 | 3/1998 |

OTHER PUBLICATIONS

English translation of abstract of (German language) EP 0305857, 1 page.
English translation of abstract of (German language) EP 1245143, 1 page.
English translation of abstract of DE 102006004222, 1 page.
English translation of abstract of DE 4008287, 1 page.
International Search Report and Written Opinion, mailed Dec. 23, 2009, received in corresponding International Patent Application No. PCT/EP/2009/062864, 8 pages.
International Preliminary Report on Patentability, mailed Jun. 3, 2011, received in corresponding International Patent Application No. PCT/EP/2009/062864, 7 pages.

* cited by examiner

MUSHROOM PRODUCTION PROCESS

RELATED APPLICATIONS

The subject application is a U.S. National Stage application of International Application No. PCT/EP2009/062864, filed on 2 Oct. 2009, which claims the priority of Irish Patent Application No.: 2008/0927, filed on 20 Nov. 2008, the contents of which are herein incorporated by reference in its entirety.

INTRODUCTION

The present invention relates to a mushroom production process. In particular, the invention relates to a mushroom production process comprising the steps of preparing a mushroom growing shed with at least one bed of mushroom compost; supplying heat to the mushroom growing shed; harvesting the mushrooms and removing the spent mushroom compost from the mushroom growing shed.

Commercial mushroom production involves the use of a substrate of compost mixed with actively growing mushroom culture known as mycelium. This mushroom compost will comprise substances such as wood chips, grain, sawdust, hay, straw, manure, poultry litter, gypsum, paper, nut and seed hulls and other such substances. This compost will supply the nutrients required for mushroom growth. In general, the mushroom compost will be quite moist, having a moisture content in the region of 50% to 75%. The compost may also comprise pesticides and the like to prevent infestations of the compost.

Mushroom production requires carefully controlled environments having the desired levels of light, heat and humidity to provide maximum output. It is common to use polytunnels to provide a suitable environment for mushroom cultivation, allowing control of these factors, and providing a certain degree of insulation. A single load of mushroom compost will in general produce three flushes of mushrooms over a six week period, whereafter the mushroom compost has lost most of its nutrients and is subject to diminishing returns. It is therefore not suitable for further commercial mushroom production. Consequently, it is removed from the mushroom growing environment and replaced with fresh mushroom compost. The spent mushroom compost must then be disposed of, which can be difficult and time-consuming. The spent mushroom compost may be discarded or may be used for fertilizer or the like. While spent mushroom compost is effectively a biomass having a useful energy content, it can be difficult to recover this energy or to convert it to a useful form. For example, the moisture content of the spent mushroom compost, which can be as high as 75% or 80%, reduces the energy density thereof and makes it very difficult to convert the energy therefrom using the known thermal treatment methods such as combustion.

It is an object therefore of the present invention to provide an improved mushroom production process that overcomes at least some of the above-mentioned problems.

STATEMENTS OF INVENTION

According to the invention there is provided a mushroom production process comprising the steps of:
  preparing a mushroom growing shed with at least one bed of mushroom compost;
  supplying heat to the mushroom growing shed;
  harvesting the mushrooms,
  removing the spent mushroom compost from the mushroom growing shed;
  combusting the spent mushroom compost in an energy conversion system;
  harnessing the heat generated by combusting the spent mushroom compost; and
  using the harnessed heat to control the temperature of the mushroom growing shed.

In this way, the biomass energy stored in the spent mushroom compost may be converted into useful heat energy. This heat energy may then be used to control the temperature of the mushroom growing shed itself, thereby reducing the energy costs of the mushroom production process and increasing the profits associated therewith. The harnessed heat may be used to provide space heating for the mushroom growing shed, or in some cases, the harnessed heat may be used to cool the mushroom growing shed, for example using absorption refrigeration, or indirectly, using compressor refrigeration. Additionally, the process of the invention assists with the problem of disposing of the spent mushroom compost, allowing the spent mushroom compost to be handled on site In one embodiment of the invention there is provided a mushroom production process in which the step of combusting the spent mushroom compost comprises combusting the spent mushroom compost in a fluidised bed unit. This is a particularly effective way of combusting the spent mushroom compost, with fluidised bed units being efficient for use with biomass fuels. In this way, the mushroom production process of the invention can efficiently handle the relatively high moisture content of the spent mushroom compost fuel. Depending on the content of the mushroom compost, there may be regulatory requirements for its combustions to ensure the emissions therefore are safe. For example, it may be necessary to ensure that the spent mushroom compost is thermally treated at a temperature of 850° C. for a minimum of 2 seconds. The use of the fluidised bed unit allows the thermal treatment of the spent mushroom compost to be accurately controlled so as to ensure these regulatory requirements are met.

In another embodiment of the invention there is provided a mushroom production process comprising the steps of initially storing spent mushroom compost in an open storage area adjacent the fluidised bed unit; and drawing air for supply to the fluidised bed unit from above the open storage area. The air in the vicinity of the spent mushroom compost is considered foul air as it comprises a high proportion of the emissions being generated by the spent mushroom compost. By sucking in this foul air for supply to the air intake of the fluidised bed, the emissions in the air will form part of the thermal reaction within the fluidised bed furnace, thereby reducing the emissions in the atmosphere.

In a further embodiment of the invention there is provided a mushroom production process comprising the step of pre-heating the air for supply to the fluidised bed unit. This assists in the stability of the combustion process within the fluidised bed. The addition of cool air can lower the fluidising bed temperature therein, resulting in the firing of a secondary diesel burner to bring the temperature back up. The use of the diesel burner is inefficient, costly and is therefore preferably avoided. By ensuring that warm air is used to fluidise the bed, this instability will be reduced. Preferably, the air will be pre-heated to a temperature in the range of 150° C. to 250° C., and ideally approximately 200° C.

In an alternative embodiment of the invention there is provided a mushroom production process comprising the step of pre-heating the air for supply to the fluidised bed unit using the harnessed heat. This is a particularly efficient manner of providing the pre-heated air and thereby increasing the efficiency of the system.

In an embodiment of the invention there is provided a mushroom production process comprising the step of, subsequent to removing the spent mushroom compost from the mushroom growing shed, drying the spent mushroom compost. By reducing the moisture content of the spent mushroom compost, the energy density thereof is increased, making it a more efficient fuel.

In one embodiment of the invention there is provided a mushroom production process in which the step of drying the spent mushroom compost comprises drying the spent mushroom compost in a rotary drum dryer. This is a particularly efficient way of drying the spent mushroom compost.

In another embodiment of the invention there is provided a mushroom production process comprising the steps of storing the spent mushroom compost in a wet fuel hopper, transferring the spent mushroom compost to a dryer; drying the spent mushroom compost; and transferring the dried spent mushroom compost to a dry fuel hopper. In this way, the wet and dry fuels may be handled effectively, ensuring that only suitably dry fuel is sent for combustion. Ideally, the transfer of the spent mushroom compost will occur automatically and substantially continually.

In a further embodiment of the invention there is provided a mushroom production process in which the step of drying the spent mushroom compost comprises drying the spent mushroom compost to a moisture level of approximately 40%, on a weight by weight basis. This is moisture level that allows efficient combustion and does not require excessive energy to achieve.

In an alternative embodiment of the invention there is provided a mushroom production process in which the step of drying the spent mushroom compost comprises drying the spent mushroom compost using the harnessed heat. This is a particularly efficient process wherein the energy stored in the biomass byproduct is used to dry the biomass product itself. This greatly reduces the energy requirements of the mushroom production process, as significant amounts of energy can be required to dry the spent mushroom compost.

In an embodiment of the invention there is provided a mushroom production process in which the step of combusting the spent mushroom compost comprises combusting the spent mushroom compost in a first fluidised bed unit and a second fluidised bed unit. In this way, the heated exhaust gases from each fluidised bed unit may be independently handled.

In one embodiment of the invention there is provided a mushroom production process comprising the step of harnessing the heat generated by combusting the spent mushroom compost in the first fluidised bed unit; and using the harnessed heat to control the temperature of the mushroom growing shed. In this way, the energy requirements for the mushroom production process will be reduced. The mushroom production process will approach being self-sufficient for heating or cooling purposes, eliminating the requirements for expensive oil-fired boilers or refrigeration units and the associated logistics problems such as fuel supply for the oil-fired burners.

In another embodiment of the invention there is provided a mushroom production process comprising the step of using the heat generated by combusting the spent mushroom compost in the second fluidised bed unit for drying the spent mushroom compost. This is a particularly efficient manner of drying the spent mushroom compost, wherein a portion of the spent mushroom compost fuel is combusted to generate heat to dry the spent mushroom compost so that it is suitable for efficient combustion.

In an alternative embodiment of the invention there is provided a mushroom production process comprising the additional step of using the harnessed heat to control the temperature of a dwelling. In this way, some of the heat energy may be used for space heating in a house, office or similar, thereby again reducing energy costs or potentially supplying a further revenue stream. Similarly, the harnessed heat may be used to cool the dwelling using absorption refrigeration or the like.

In an embodiment of the invention there is provided a mushroom production process in which the step of harnessing the heat generated by the combustion of the spent mushroom compost comprises passing exhaust gases from the combustion of the spent mushroom compost through a heat exchanger. This is a particularly convenient method of harnessing the heat generated by the combustion.

In one embodiment of the invention there is provided a mushroom production process in which step of harnessing the heat generated by the combustion of the spent mushroom compost comprises using the heat from the combustion of the spent mushroom compost to heat a liquid. The heat energy may then be transferred and stored by transferring and storing the liquid.

In another embodiment of the invention there is provided a mushroom production process comprising the step of delivering the heated liquid to a radiator element. In this way, the radiator element may be used to provide space heating.

In a further embodiment of the invention there is provided a mushroom production process in which the radiator element is located inside the mushroom growing shed. In this way, the radiator element may be used to heat the mushroom growing shed, thus reducing, or in some cases eliminating, the requirement for other heating sources such as fossil fuel boilers or electricity.

In an alternative embodiment of the invention there is provided a mushroom production process comprising the steps of drawing air over the radiator element and distributing the heated air inside the mushroom growing shed. This is a particularly efficient method of heating the mushroom growing shed.

In an embodiment of the invention there is provided a mushroom production process comprising the step of transferring the heated liquid to a buffer tank prior to delivery to the radiator element. This is a convenient method of storing the heated liquid, and consequently the heat energy, for distribution.

In a further embodiment of the invention there is provided a mushroom production process further comprising the steps of monitoring the temperature of the heated liquid in the buffer tank and maintaining the temperature of the heated liquid in the buffer tank at a desired temperature. In this way, the temperature of the heated liquid can be kept at a suitable temperature. Additionally, this provides for an effective central control mechanism for the temperature of the distributed heated liquid.

In one embodiment of the invention there is provided a mushroom production process in which the heated liquid is heated to a temperature of the order of 85° C. This is a particularly convenient temperature in that the liquid may be heated effectively to this temperature by the heat exchangers and that liquid at this temperature can supply the required heat energy to a number mushroom growing sheds to keep them at the required temperature.

In another embodiment of the invention there is provided a mushroom production process in which the heated liquid is heated to a temperature of the order of 100° C. In this way, the heated liquid may be used to sterilize the mushroom growing sheds.

In one embodiment of the invention there is provided a mushroom production process in which the heated liquid is heated to a temperature of the order of 160° C. This is a particularly useful temperature for the heated liquid.

In a further embodiment of the invention there is provided a mushroom production process in which the liquid is water. Water is a particularly efficient liquid for use in heat transfer systems.

In an embodiment of the invention there is provided a mushroom production process in which the water is heated to provide steam. In this way, the steam may be used to sterilise the mushroom growing sheds, and may also be used for other heating or sterilising functions. It is common practice to stream mushroom growing sheds before the removal of the spent mushroom compost so that any bio-hazards present are removed, effectively decontaminating the mushroom growing sheds and spent mushroom compost. Ideally, steam is provided to a mushroom growing shed for 24 hours, at a temperature of 150° C. and a pressure of 6.5 bar.

In another embodiment of the invention there is provided a mushroom production process comprising the step of adjusting the temperature of the mushroom growing shed prior to preparing the mushroom growing shed with at least one bed of mushroom compost. In this way, the mushroom growing shed will be at the optimal temperature for mushroom production when the mushroom compost is placed therein.

In a further embodiment of the invention there is provided a mushroom production process in which the temperature of the mushroom growing shed is adjusted to a temperature of approximately 26° C. This is a particularly useful temperature for mushroom production. It is necessary to have conditions of high humidity, high temperature and high $CO_2$ levels in the mushroom growing shed when the mushroom compost is first placed in the mushroom growing shed. The temperature of the mushroom growing shed is adjusted in advance to 26° C. This temperature is maintained for approximately the first 7-10 days of the production cycle. At the same time, humidity of 95% and high levels of $CO_2$ will be maintained in the mushroom growing shed. The $CO_2$ is emitted by the mushroom compost itself. The air vents in the mushroom growing shed are closed during this phase of production so as to maintain the required conditions —fresh air would lower the $CO_2$ levels. Over the following 2-3 weeks, as the mushrooms sprout, the humidity is gradually reduced to 92%-88% and the temperature is reduced to between 23° C.-18° C. Similarly, once sprouting has occurred, the air vents in the mushroom growing shed are opened to allow fresh air to circulate and so reduce the $CO_2$ levels. Consequently, the heat requirement for the mushroom growing shed should lessen over the six week growing cycle but, in general there will be a plurality of mushroom growing shed on a single site and their growing cycles will be staggered. In this way, at least one mushroom growing shed will always have a high heat energy requirement, and the total heat energy requirement for the all the mushroom growing sheds at the sites will be generally constant.

In an alternative embodiment of the invention there is provided a mushroom production process in which the spent mushroom compost from a previous mushroom growing cycle is burnt to provide heat to be harnessed for use in the current mushroom growing cycle in the mushroom growing shed. In this way, a continual supply of energy is available for successive mushroom growing cycles, reducing or eliminating the need for external energy sources for the mushroom production facility.

In an embodiment of the invention there is provided a mushroom production process comprising the step of, after removing the spent mushroom compost from the mushroom growing shed, delivering the spent mushroom compost to a fuel storage area for subsequent combustion. This is a convenient manner of managing the fuel supply for the mushroom production process of the invention.

In one embodiment of the invention there is provided a mushroom production process in which the fuel storage area comprises an open storage area adjacent the combustion apparatus. In this way, the spent mushroom compost fuel is conveniently located and may be easily loaded into a fuel hopper. Additionally, the air intake for the fluidised bed unit may be located above this open storage area so that emissions from the spent mushroom compost may be combusted.

In another embodiment of the invention there is provided a mushroom production process in which the fuel storage area comprises a wet fuel hopper in communication with the combustion apparatus. In this way, the spent mushroom compost is directly ready for processing.

In a further embodiment of the invention there is provided a mushroom production process in which the fuel storage area comprises a remote storage area. In this way, the spent mushroom compost may be removed to a separate site before being processed by the method of the invention. As discussed above, it is common for spent mushroom compost to be sterilised, generally by being steamed, before removal from the mushroom growing sheds so that no bio-hazards are transferred elsewhere in the mushroom production site. This is particularly relevant if the spent mushroom compost is to be stored on the mushroom production site for subsequent processing. However, the steaming has disadvantage of further increasing the moisture content of the spent mushroom compost. If the spent mushroom compost is removed to a site remote from the mushroom production site, the risk of contamination of fresh mushroom compost by any biohazards in the spent mushroom compost is greatly reduced without the requirement to increase the moisture content of the spent mushroom compost, thus reducing the energy requirement for drying the spent mushroom compost.

In an alternative embodiment of the invention there is provided a mushroom production process comprising the step of ventilating the mushroom growing shed. In this way, fresh air may enter the mushroom growing shed when required to adjust the temperature, humidity levels or $CO_2$ levels.

In an embodiment of the invention there is provided a mushroom production process in which the comprising the step of generating electricity with the harnessed heat generated by the combusting spent mushroom compost. In this way, the method of the invention would allow the mushroom production process to be wholly or substantially energy self-sufficient. Additionally, it may be possible to supply excess electricity to nearby buildings or the national grid.

In one embodiment of the invention there is provided a mushroom production process in which comprising the additional step of collecting the ash from the combustion of the spent mushroom compost. This ash is a useful by product and may be used for fertilizer or the like.

In a further embodiment of the invention there is provided a mushroom production process in which the harnessed heat is used to cool the mushroom growing shed. In this way, the method of the invention may be used regardless of the ambient temperature surrounding the mushroom growing shed.

DETAILED DESCRIPTION OF THE INVENTION

The invention will now be more clearly understood from the following description of an embodiment thereof given by way of example only with reference to the accompanying drawings in which:—

Figure 1:
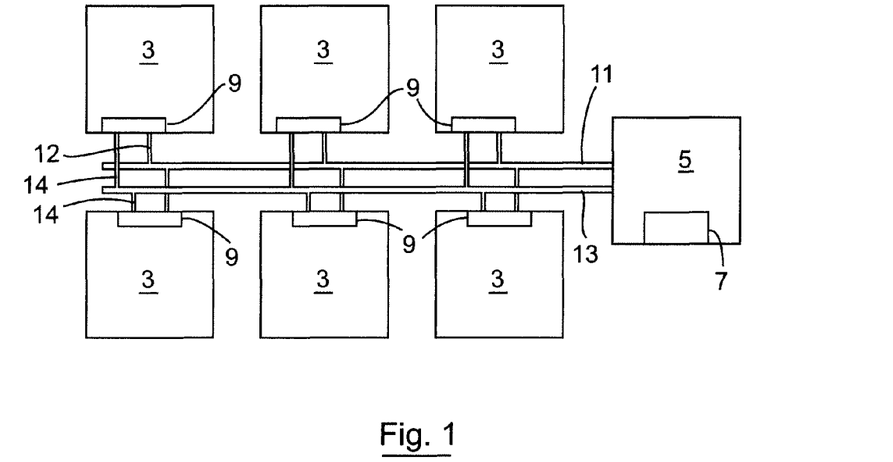
FIG. 1 is a site layout in which the process according to the present invention can be implemented.

Referring to the drawings, and initially to FIG. 1 thereof, there is shown a plan of a mushroom production site indicated generally by the reference numeral 1, comprising a plurality of mushroom growing sheds 3 and a spent mushroom compost processing site 5 including a fuel storage area 7. Each mushroom growing shed 3 comprises an indirect heater 9, comprising a radiator element (not shown) and a fan (not shown). A network of pipes runs from the spent mushroom compost processing site 5 to each of the mushroom growing sheds 3. The network of pipes comprises a main flow line 11 having a branch flow line 12 for each mushroom growing shed 3 and also a main return line 13 having a branch return line 14 for each mushroom growing shed 3.

In use, the spent mushroom compost processing plant 5 burns spent mushroom compost that has been collected from the mushroom growing sheds 3 and harness the uses the heat generated from the combustion of the spent mushroom compost to heat water in a heat exchanger. This heated water is delivered through the main flow line 11 and branch flow lines 12 to each of the radiator elements in the mushroom growing shed 3. The fans are operated to draw air over the radiator elements to heat the air and distribute the heated air inside the mushroom growing shed 3. The heated water flows through the radiator and returns to the heat exchanger through the branch return line 14 and main return line 13.

Figure 2:
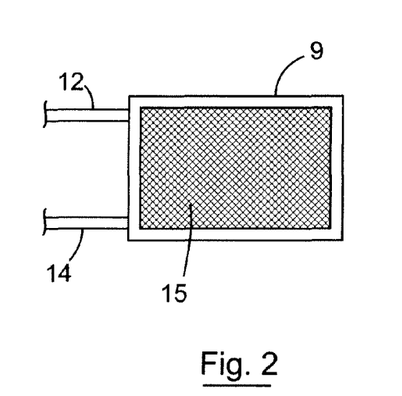
FIG. 2 is a rear view of a heater used in the process.
Figure 3:
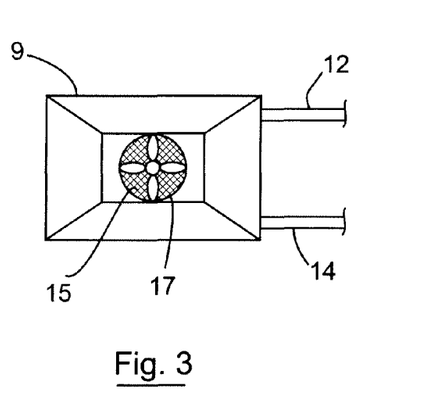
FIG. 3 is a front view of the heater of FIG. 2.

Referring to FIGS. 2 and 3, there is shown a pair of views of the indirect heater 9. The indirect heater 9 comprises a branch flow line 12 and a branch return line 14 which are connected to a radiator element 15 at one end and connected to a heated liquid source (not shown) at their other end. The indirect heater 9 comprises a fan 17 mounted on the front of the radiator element to draw air in through and over the radiator element 15 and then distribute that heated air into the inside of the shed 3.

Figure 4:
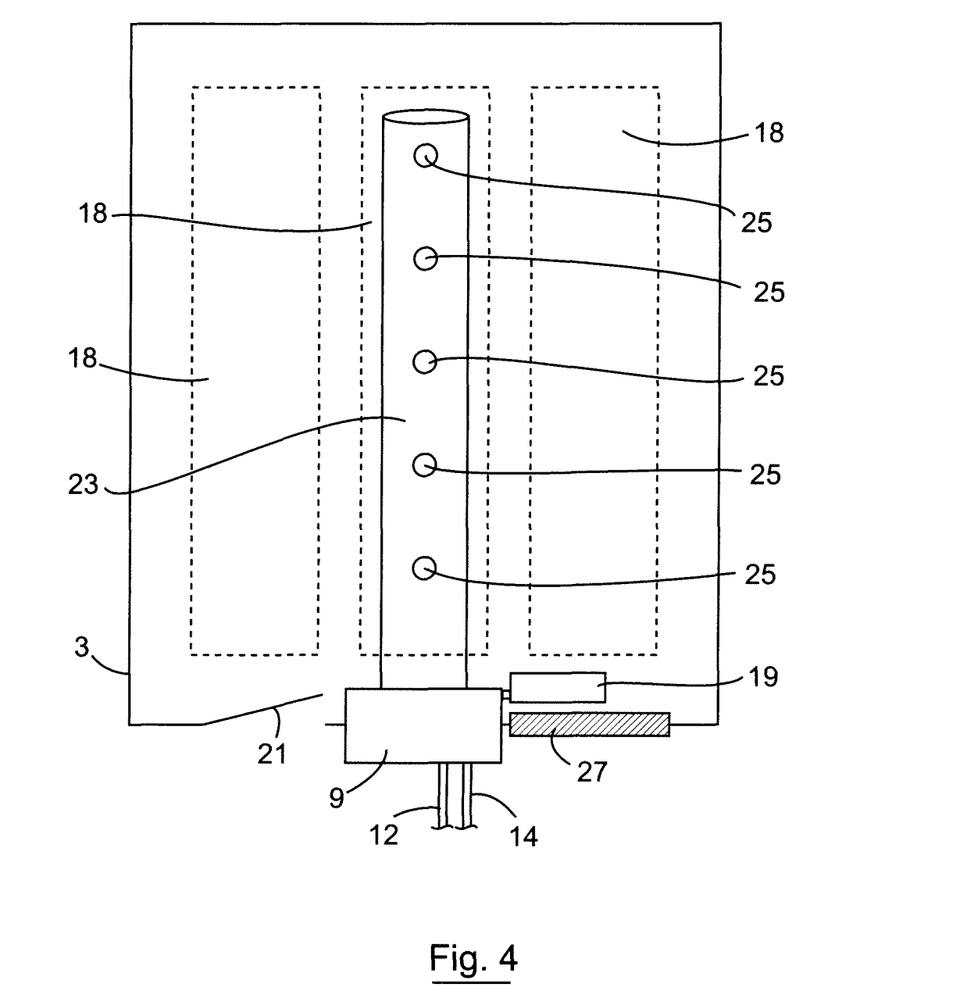
FIG. 4 is a plan view of mushroom growing shed for use in the mushroom production process of the invention.

Referring now to FIG. 4, in which like parts have been given the same reference numerals as before, there is shown the mushroom growing shed 3, generally a polytunnel, comprising three rows of mushroom growing beds 18. Each mushroom growing bed 18 will, in general, comprise three stacked trays comprising mushroom compost, covered in a layer of peat (not shown). The mushroom growing shed 3 comprises an indirect heater 9 connected to a control panel 19 having control equipment (not shown) therein to allow the temperature of the room to be set and to allow monitoring of the conditions in the shed 3. There is provided an access door 21 into the shed 3. The indirect heater 9 is mounted near the top of the mushroom growing shed 3 and is connected to a branch flow line 12 and a branch return line 14. The fan (not shown) of the indirect heater 9 is connected to an air-sock 23 which extends along the length of the mushroom growing shed 3, located substantially along the midline thereof. The air-sock 23 comprises a plurality of apertures 25 therein for distributing the heated air conveyed by the air-sock 23 along the length of the mushroom growing shed 3. The mushroom growing shed 3 further comprises a louvered air vent 27 in the so that the air inside the mushroom growing shed 3 may be vented as necessary. The vents 27 may be locked closed such that minimal air can pass through them, or may be left open in which case air will pass through them due to the air flow inside the mushroom growing shed.

Figure 5:
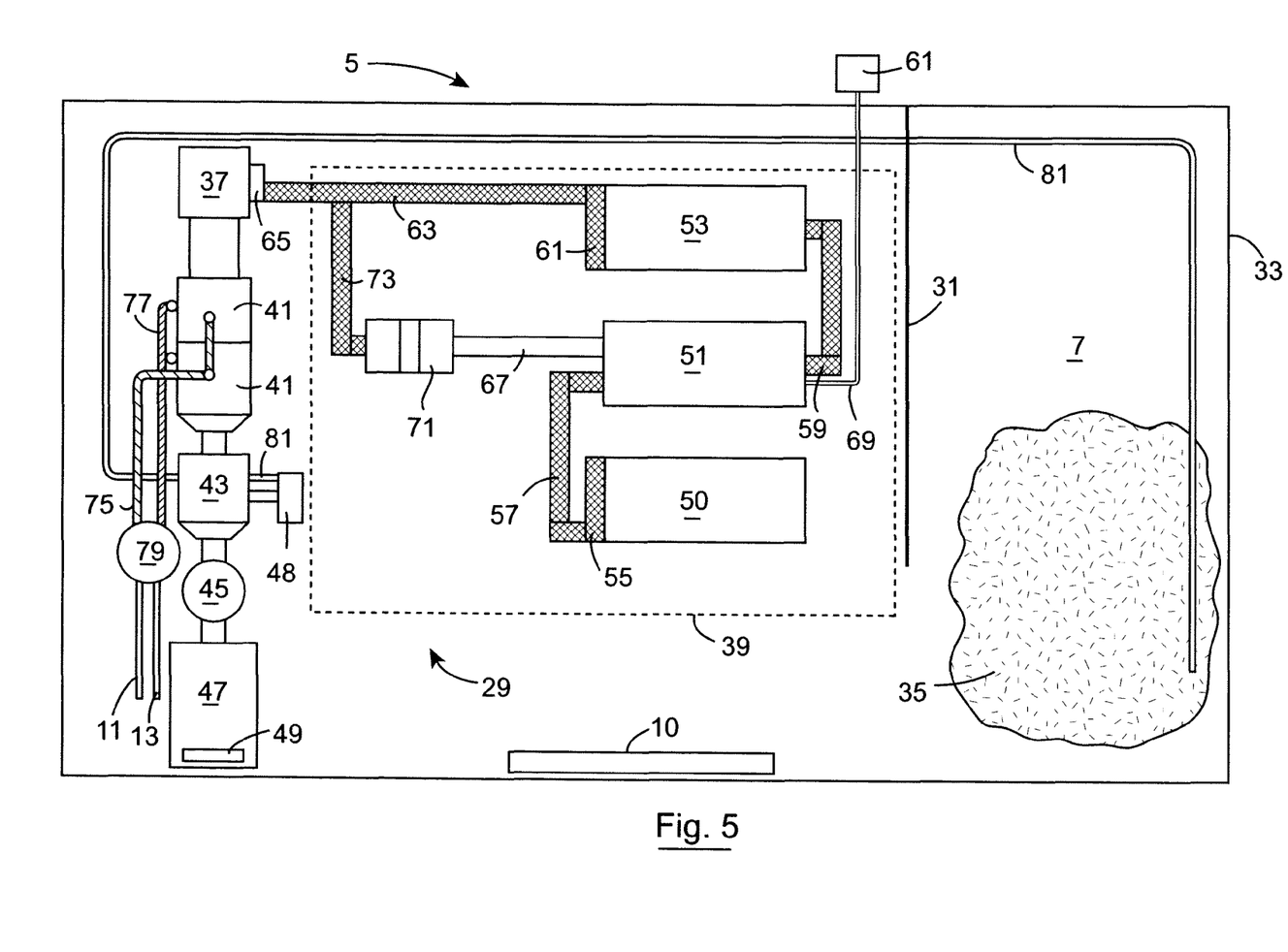
FIG. 5 is a plan view of an apparatus used to implement the steps of the invention.

Referring to FIG. 5, in which like parts have been given the same reference numerals as before, there is shown a spent mushroom compost processing site indicated generally by the reference numeral 5, comprising an energy conversion system, indicated generally by the reference numeral 29 and a fuel storage area 7. The energy conversion system 29 is partially separated from the fuel storage area 7 by a dividing wall 31 which projects orthogonally from the surrounding wall 33 of the spent mushroom compost processing site 5. A load 35 of spent mushroom compost is located within the fuel storage area 7. The energy conversion system 29 comprises a combustion apparatus in the form of a first fluidised bed unit 37, a by-product fuel feed system 39, indicated by the dashed box, feeding the first fluidised bed unit 37, a pair of primary heat exchangers 41 operatively coupled to the first fluidised bed unit 37, an air-air heat exchanger 43, an ash cyclone 45, and exhaust filter 47 and a negative pressure system. The negative pressure system comprises a forced draught fan 48 connected, by way of a air pipe (not shown), to the first fluidised bed unit 37 and an induction draught fan 49 mounted on the exhaust filter 47 which are operable to maintain a flow of exhaust gases in the direction from the first fluidised bed unit 37 through the primary heat exchangers 41 and onwards.

The by-product fuel feed system 39 comprises a wet fuel hopper 50, a rotary drum dryer 51 and a dry fuel hopper 53. The wet fuel hopper 50 is fitted with a first variable speed auger 55 which supplies the spent mushroom compost fuel onto a first fuel conveyor 57 to deliver the spent mushroom compost by-product fuel exiting the wet fuel hopper 50 to the rotary drum dryer 51. The rotary drum dryer 51 comprises three rotating drums (not shown) arranged on an incline such that wet fuel entering will be discharged as dry fuel at the opposite end thereof. The by-product fuel feed system 39 comprises a second fuel conveyor 59 for conveying the spent mushroom compost fuel from the rotary drum dryer 51 to the dry fuel hopper 53. Finally the dry fuel hopper 53 comprises a second variable speed auger 61 for conveying spent mushroom compost fuel onto a main fuel conveyor 63. The main fuel conveyor 63 conveys fuel to a fuel metering unit 65 which is in turn connected to a fuel charging inlet (not shown) on the first fluidised bed unit 37. The fuel metering unit 65 comprises twin, counter-rotating augers (not shown) for accurately controlling the fuel that is fed into the first fluidised bed unit 37, such that the combustion temperature therein may be accurately controlled. The rotary drum drier is supplied with heated gases via a gas inlet 67 and has an exhaust gas outlet 69 which is vented through a filtering system 61 outside the spent mushroom compost processing site 5. The by-product fuel feed system 39 further comprises a second fluidised bed unit 71, which may be of a smaller size to the first fluidised bed unit 37. The second fluidised bed unit 71 receives fuel from a dryer fuel conveyor 73 which branches off from the main fuel conveyor 63. The spent mushroom compost fuel is fed to a fuel metering unit (not shown) similar to the fuel metering unit 65 connected to the first fluidised bed unit 37. The heated exhaust gases generated by the second fluidised bed unit 71 are fed into the rotary drum dryer 51 by way of the gas inlet 67. The rotary drum dryer 51 is fitted with a dryer induction fan (not shown) to generate a negative pressure within the second fluidised bed unit 71 and thus draw the heated exhaust gases through the rotary drum dryer 51. The second fluidised bed unit 71 produces exhaust gases having a temperature in the range 800-900° C. for drying the spent mushroom compost fuel. In this way, the by-product fuel, in this case spent mushroom compost, is used to provide energy to dry the by-product fuel itself Exhaust gases generated by the combustion of spent mushroom compost by-product fuel within the first fluidised bed unit 37 are passed through the pair of primary heat exchangers 41, and from there the air-air heat exchanger 43. Thereafter the exhaust gases pass through the ash-cyclone 45, which allows ash to collect therein and finally the exhaust gases are passed through the exhaust filter 47, generally a bag filter. Exhaust gases from the exhaust filter 47 are sufficiently cooled and clean to be released to the atmosphere.

The heat exchangers 41 are connected to a piping network comprising a hot-water pipe 75 and a cold water pipe 77 which are connected to a buffer tank 79, from which the water supplies for the mushroom production site are drawn. The main flow line 11 and main return line 13 for supplying heated water, and returning cooled water to and from the mushroom growing sheds are connected to the buffer tank 79.

The energy conversion system 29 operates to keep the liquid, in this case water, in the buffer tank 79 at a uniform temperature, preferably 85° C. The energy conversion system 29 burns spent mushroom compost and harnesses the heat from the combustion of the spent mushroom compost to heat water which is passed to the buffer tank 79. The hot water in the buffer tank 79 is then delivered to the radiator elements of the indirect heaters 9 in the sheds 3 and returned to the buffer tank 79 where it may then be returned to the energy conversion system 29 for re-heating. Various hydronic manifolds may be provided to ensure that the flow and the return water is kept as separate as possible to prevent thermal siphoning of the heat in the water and to ensure that the hottest water is delivered to the indirect heaters 9 and the coldest water is returned to the spent mushroom compost processing plant 5.

The energy conversion system 29 further comprises an air intake pipe 81 which is mounted on the external walls 33 of the spent mushroom compost processing site. The air intake pipe 81 has an open end located in the fuel storage area 7, ideally above any spent mushroom compost that may be stored there. In this way, the foul air emanating from the load 35 of spent mushroom compost is the source of the air in the air intake pipe 81. The forced draught fan 48 is connected to the other end of the air intake pipe 81, such that the forced draught fan 48 operates on the air taken from the fuel storage area 7. The forced draught fan 48 forces the intake air through the air-air heat exchanger 43 so that the intake air is heated through indirect interaction with the exhaust gases coming from the first fluidised bed unit 37. The forced draught fan 48 forces the intake air through the air-air heat exchanger 43 and from then on to the sump of the first fluidised bed unit 37 to provide the fluidisation of the particles therein. In this way, the fluidising air within the first fluidised bed unit 37 is heated which will provide greater stability in the operation of the first fluidised bed unit 37, thereby making it more energy efficient.

The exhaust filter 47 is a bag filter having a plurality of bags to catch the fly ash from the exhaust gases. The exhaust filter 47 comprises an ash extractor auger (not shown) located at the bottom of the exhaust filter 47. The induction draught fan 49 is coupled to the exhaust filter 47 and draws exhaust gases through the spent mushroom compost processing plant 5 from the first fluidised bed unit 37, through the heat exchangers 41 and through the exhaust filter 47.

Figure 6:
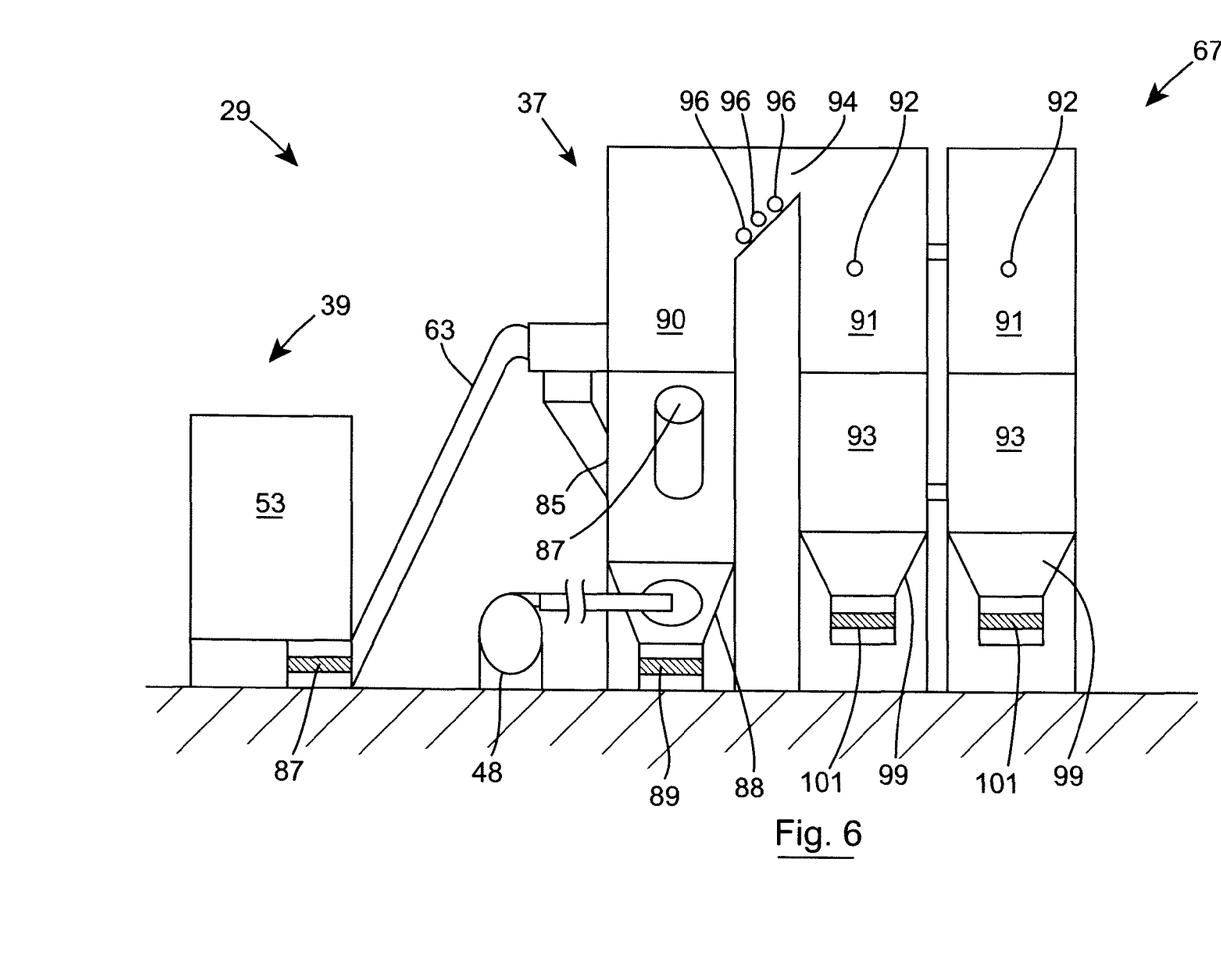
FIG. 6 is a diagrammatic representation of a side view of part of the energy conversion system used in the invention.

Referring now to FIG. 6, in which like parts have been given the same reference numerals as before, there is shown a diagrammatic representation of a side view of a portion of the energy conversion system 29. The energy conversion system 29 comprises the combustion apparatus in the form of the first fluidised bed unit 37 which in turn comprises a charging inlet 85 for fuel delivered by the by-product fuel feed system 39, a diesel burner (not shown) connected to a burner inlet 87 and a furnace sump 88 containing fluidised bed media (not shown). The furnace sump 88 tapers inwardly towards the bottom of the furnace sump 88 where there is a clinker and ash extraction unit, in this case a furnace ash removal auger 89 located at the bottom of the furnace sump. The fluidised bed unit 37 further comprises an air introducer assembly (not shown) most of which is mounted substantially in the furnace sump 88 for delivering air up through the fluidised bed media in the sump 88. The air introducer is connected to the forced draught fan 48 from the negative pressure system. In this case, the forced draught fan 48 is not located adjacent the sump 88, but, as illustrated in FIG. 5, is located beside the air-air heat exchanger 43 and connected to the sump 88 by a pipe. Above the furnace sump 88 is the furnace freeboard 90.

Each of the pair of primary heat exchangers 41 comprises a pair of heat exchanger assemblies, an upper heat exchanger assembly 91 and a lower heat exchanger assembly 93. Each lower heat exchanger assembly 93 is provided with a cold water return pipe and each upper heat exchanger assembly 91 is provided with a hot water flow pipe. The cold water return pipes are connected together to form the coldwater pipe 77 and the hot water flow pipes are connected together to form the hot water pipe 75. In this way, the cold water is divided between each heat exchanger 41 and then the hot water from each heat exchanger 41 is recombined at the outlet. The lower heat exchanger assembly 93 and the upper heat exchanger assembly 91 are in liquid communication with each other so that liquid that travels into the lower heat exchanger assembly 93 travels upwards through the lower heat exchanger, into the upper heat exchanger, upwards through the upper heat exchanger 91 and out of the hot water flow pipe in the upper heat exchanger assembly 91.

Each upper heat exchanger assembly 91 further comprises a heat exchanger soot blower 92 mounted across the heat exchanger and extending between a plurality of tubes (not shown) of the upper heat exchanger unit. The heat exchanger soot blowers 92 are rotatably mounted in the upper heat exchanger assemblies 91. Below the lower heat exchanger assemblies 93 are heat exchanger sumps 99, each of which are provided with a heat exchanger ash removal auger 101 to remove ash from the heat exchanger sump 99. The heat exchanger 41 is operatively coupled to the fluidised bed unit 37 by way of a freeboard interconnector 94 for passage of the heated exhaust gases. The freeboard interconnector 94 is provided with a plurality of pulsed blower nozzles 96 arranged substantially in line with the floor of the freeboard interconnector 94. Pressurised air is periodically passed through the pulsed blower nozzles 96 to dislodge any settled ash from the floor of the freeboard interconnector 94.

Figure 7:
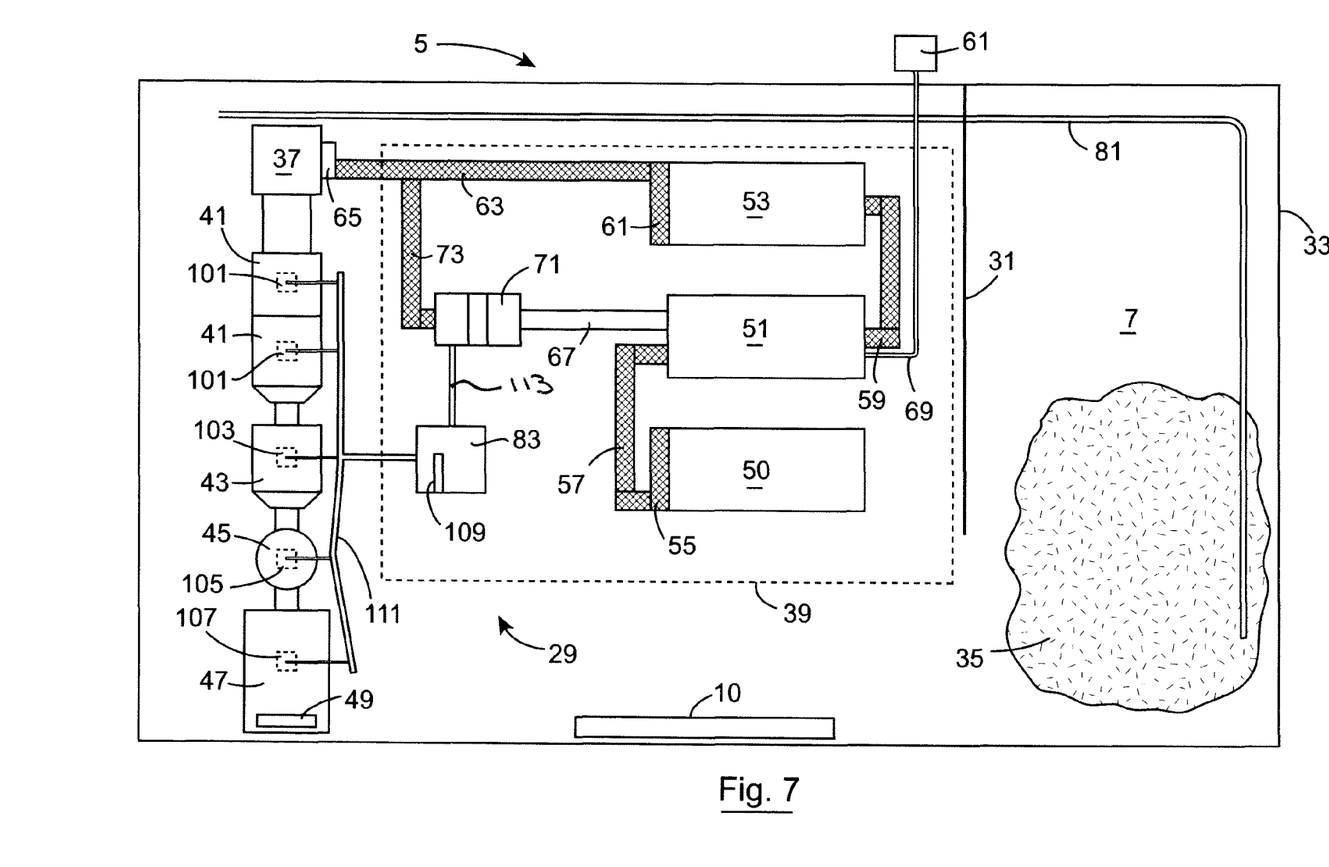
FIG. 7 is a plan view of an apparatus used to implement the steps of the invention showing an ash handling system.

Referring to FIG. 7, in which like parts have been given the same reference numerals as before, there is shown the spent mushroom compost processing site 5, showing an ash collection system comprising an ash storage tank 83. For clarity purposes, the pipe network and buffer tank for dealing with the hot water are not shown in this figure. The spent mushroom compost processing site 5 comprises an energy conversion system, indicated generally by the reference numeral 29 and a fuel storage area 7. A load 35 of spent mushroom compost is located within the fuel storage area 7. The energy conversion system 29 comprises a combustion apparatus in the form of a first fluidised bed unit 37, a by-product fuel feed system indicated generally by the reference numeral 39 feeding the first fluidised bed unit 37, a pair of primary heat exchangers 41 operatively coupled to the first fluidised bed unit 37, an air-air heat exchanger 43, an ash cyclone 45, and exhaust filter 47 and a negative pressure system. The negative pressure system comprises a forced draught fan 48 connected, by way of a air pipe (not shown), to the first fluidised bed unit 37 and an induction draught fan 49 mounted on the exhaust filter 47 which are operable to maintain a flow of exhaust gases in the direction from the first fluidised bed unit 37 through the primary heat exchangers 41 and onwards. The second fluidised bed unit 71 comprises a rotary valve (not shown) it its sump to which a second fluidised bed unit auger 113 is connected. The second fluidised bed unit auger 113 conveys ash from the sump of the second fluidised bed unit 71 to the ash storage tank 83. Each of the primary heat exchangers 41, the air-air heat exchanger 43, the ash cyclone 45 and exhaust filter 47 are fitted with rotary valves 101, 103, 105, 107 respectively in their sump portions. The rotary valves are constructed to allow the ash to exit the system, while allowing the system to remain substantially air-tight and thus maintain the negative pressure therein. The ash collection system further comprises an auger system 111, which includes the two heat exchanger ash removal augers 101, and collects ash from below each of the rotary valves 101, 103, 105, 107 and delivers it to the ash storage tank 83. The ash storage tank 83 is fitted with an ash transfer auger 109 to allow the collected ash to be transferred to trailer for removal.

Figure 8:
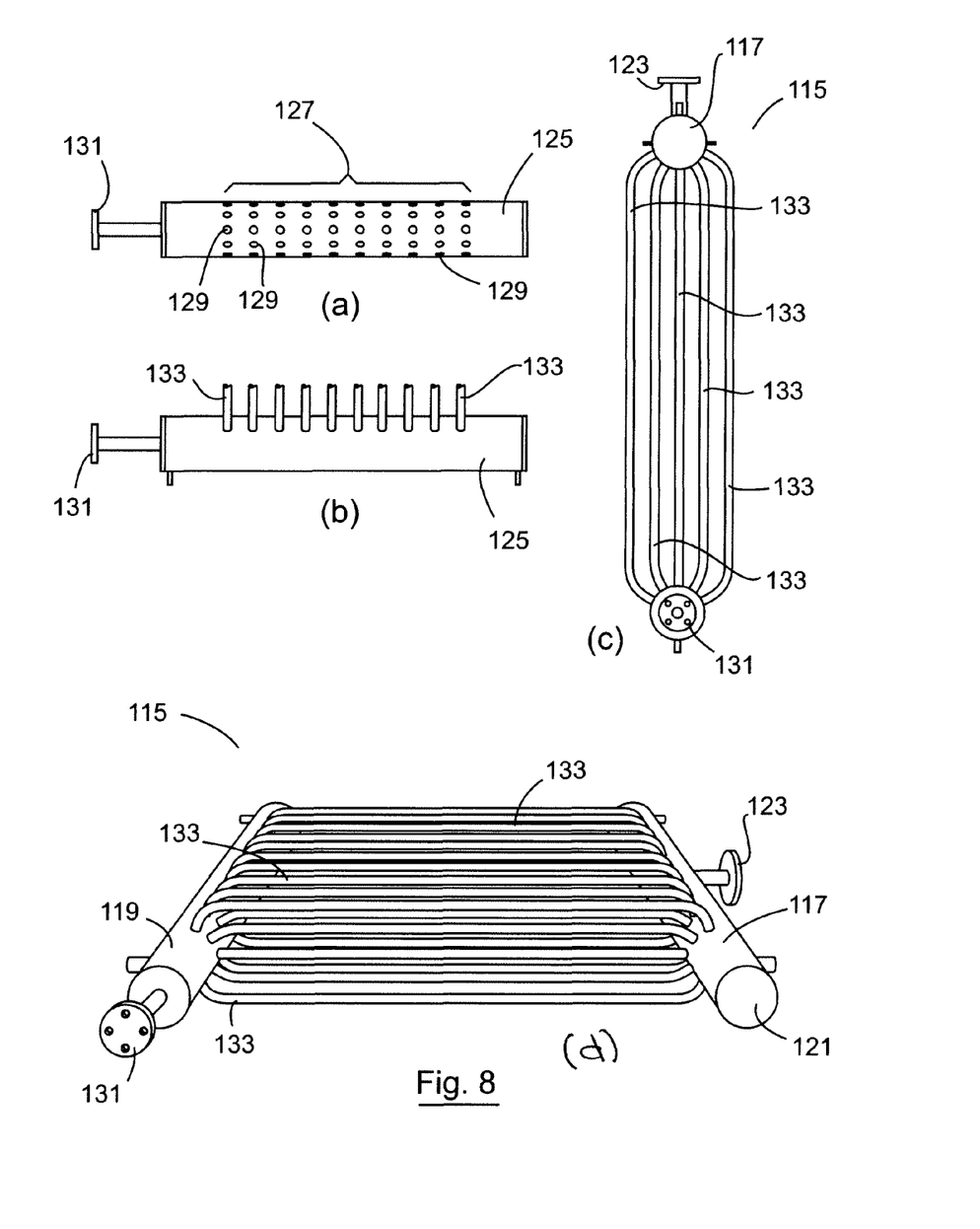
FIG. 8(a) is a side view of a portion of the heat exchanger used in the method of the invention.
FIG. 8(b) is a side view of a part of the heat exchanger used in the method of the invention.
FIG. 8(c) is a side view of a detail of the heat exchanger used in the method of the invention.
FIG. 8(d) is a perspective view of the heat exchanger used in the method of the invention.

Referring to FIG. 8, in which like parts have been given the same reference numerals as before, there is shown a heat exchanger unit indicated generally by the reference numeral 115 comprising a first manifold 117 and a second manifold 119. The first manifold 117 comprises an elongate substantially cylindrical body 121, closed at both ends and fitted with a water inlet 123 that projects substantially orthogonally from the body 121 approximately midway along its length. The first manifold 117 further comprises an array of through-holes dispersed along one semi-cylindrical face thereof, the through-holes being arranged in a series of five rows. The second manifold 119 is substantially similar to the first manifold 117, comprising an elongate substantially cylindrical body 125 having an array 127 of through-holes 129 dispersed along one semi-cylindrical face thereof, the through-holes being arranged in a series of five rows. The second manifold 119 does not comprise a water inlet, but comprises a water outlet 131 connected to one of the ends of the cylindrical body 125. When assembled, a heat exchanger pipe 133 is connected between each through-hole of the first manifold 117 and a correspondingly located through-hole 129 on the second manifold 119 such that the heat exchanger unit 115 comprises a plurality of sets of heat exchanger pipes 133, each set of heat exchanger pipes comprise five heat exchanger pipes 133. The water inlet 123, first manifold 117, heat exchanger pipes 133, second manifold 119 and water outlet 131 are all in fluid communication such that water will flow into the first manifold 117 though the water inlet 123, from there to the second manifold 119 by the heat exchanger pipes 133, and from the second manifold 119 out the water outlet 131.

Figure 9:
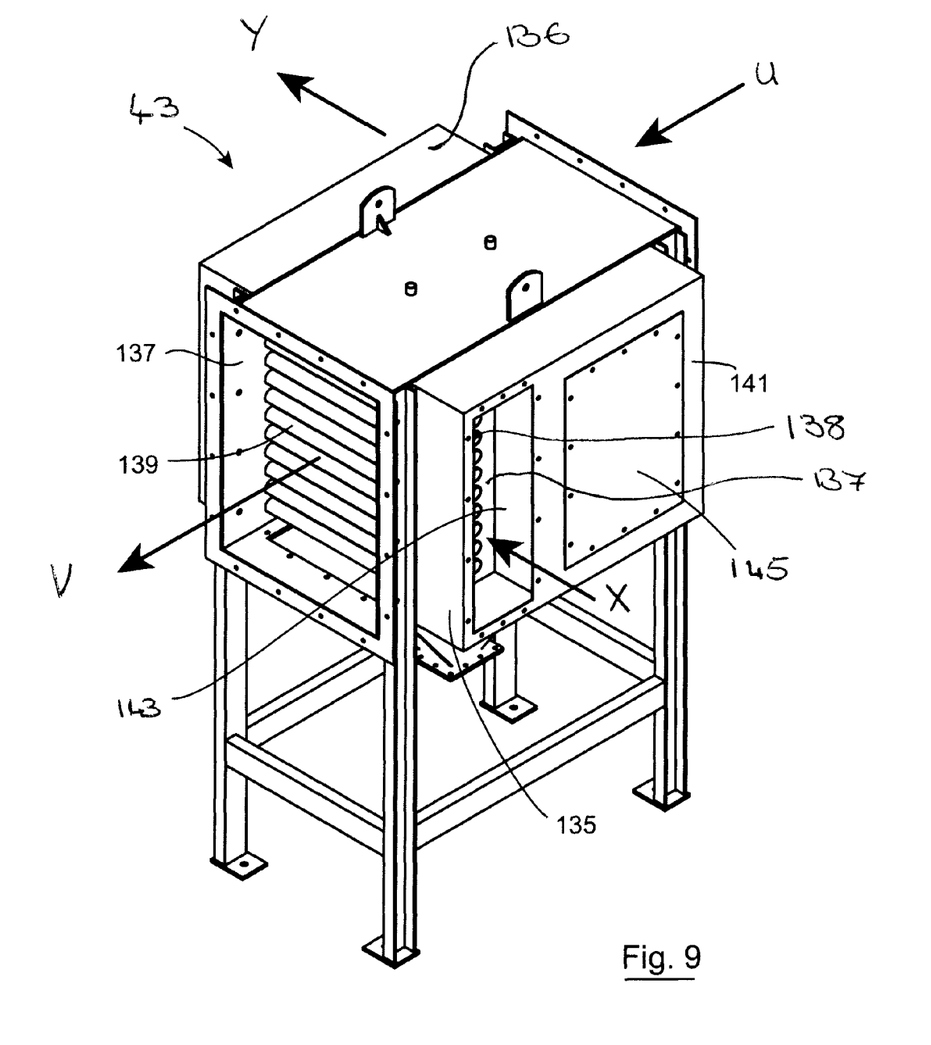
FIG. 9 is a perspective view of the air-air heat exchanger used in the method of the invention.

Referring to FIG. 9, in which like parts have been given the same reference numerals as before, there is shown an air-air heat exchanger indicated generally by the reference numeral 43. The air-air heat exchanger 43 comprises a pair of identical air manifolds a cold air manifold 135, and a hot air manifold 136 each comprising a manifold plate 137 having a regular array of air apertures 138 dispersed thereover. A plurality of air pipes 139 are connected horizontally between the air apertures 138 of the pair of manifold plates 137. The air manifolds 135 comprise a substantially cuboid box, of which the manifold plate 137 forms one side thereof. The opposite side the manifold is partially covered, with a window 143 to allow the passage of air. There is further provided an inspection door 145 in each air manifold. In use, the exhaust air from the primary heat exchangers 41 is fed into the air-air heat exchanger 45 through a pyramid-shaped inlet (not shown) in the direction of arrow U. The exhaust gases pass around the air pipes 139, thereby heating the air pipes 139. The exhaust gases then exit the air-air heat exchanger 43 in the direction of arrow V and continue to the ash cyclone 45. Ambient air is sucked in through the window 143 in the cold air manifold 135 and through the air pipes 139 into the hot air manifold 136, from where they exit the hot air manifold through the window therein (not shown). The window in the hot air manifold is located diagonally opposite that of the cold air manifold. As the ambient air passes through the heated air pipes 139, it becomes heated. The ambient air is sucked through the air-air heat exchanger 43 by the forced draught fan 48 and then fed to the air inlet of the first fluidised bed unit 37.

In use, spent mushroom compost is delivered from the fuel storage area 7 into the wet fuel hopper 49. From there, the fuel will be pushed toward the first variable speed auger 55 at the end of the wet fuel hopper 49. The first variable speed auger 55 will transfer the fuel onto the first fuel conveyor 57 which will deliver the moist spent mushroom compost fuel into the rotary drum dryer 51, where it will be exposed to heated gases from the second fluidised bed unit and thereby have its moisture content reduced. The spent mushroom compost fuel is then transferred from the rotary drum dryer 51 to the dry fuel hopper 53 along the second fuel conveyor 59. The dry spent mushroom compost fuel is stored in the dry fuel hopper 53 and is delivered therefrom on to the main fuel conveyor 63 by the second variable speed auger 61. The spent mushroom compost fuel is delivered by the main fuel conveyor 63 to the fuel metering unit 65 of each of the first fluidised bed unit 37 and the second fluidised bed unit 71. The temperature of the fluidised bed in the each fluidised bed unit is between 610° C. and 750° C., preferably approximately 670° C. Just above the fluidised bed, in the lower furnace freeboard, the temperature is approximately 850° C. and at the top of the upper furnace freeboard adjacent the freeboard interconnector 94, the temperature is in the region of between 900° C. and 1000° C., extending up to 1200° C. at some times.

A plurality of temperature sensors (not shown) are arranged in each of the fluidised bed units. There are four temperature sensors in the fluidised bed themselves, one temperature sensor in the lower furnace freeboard just above the fluidised bed and another temperature sensor in the upper furnace freeboard. These temperature sensors closely monitor the temperature of the fluidised bed unit and if the temperature should deviate from the desired values or ranges, corrective action may be taken. If the temperature of the fluidised bed lowers, the variable speed augers of the fuel metering unit 65 are operated to increase the amount of fuel that is delivered to the fluidised bed unit in question. If the fuel has relatively high moisture content, the fuel may not immediately cause the temperature to rise in the fluidised bed and other action must be taken. In such an instance, further fuel may be added or alternatively, the diesel burner is started and provides a boost to the fluidised bed.

The hot exhaust gases from the first fluidised bed unit 37 rise up through the furnace through the lower and upper furnace freeboards, through the interconnecting freeboard 64 and down through the heat exchangers 41. The heat exchangers 41 comprises a plurality of tubes (not shown) filled with water and the water in the tubes is heated by the hot exhaust gases passing over the tubes. The hot exhaust gases are then passed out of the heat exchanger to the air-air heat exchanger 43. The air-air heat exchanger 43 is connected to the forced draught fan 48 such that air is drawn from the fuel storage area 7 by the forced draught fan 48 and heated in the air-air heat exchanger 43 by indirect exposure to the exhaust gases from the first fluidised bed unit 37. This heated air is then supplied to the sump of the first fluidised bed unit 37 to fluidise the bed media. The exhaust gases pass from the air-air heat exchanger 43 to the ash cyclone 45 and from there to the exhaust filter 47 where fly ash is removed from the exhaust gases and the filtered exhaust gases are released into the atmosphere. The exhaust gases released into the atmosphere are still at approximately 150° C. to 200° C. The exhaust filter 47 has an ash extractor auger (not shown) which removes ash out from the filter for storage in the ash storage tank 83. The ash taken from the filter typically has a phosphorous content of 18% by weight of the ash and 8% potassium by weight of the ash and may be sold on as a useful by-product for fertilizers and the like.

The heat exchangers 41 are coupled to a heating system of the mushroom growing shed 3 shed indirectly through a buffer tank 79 and from there by the by the main flow pipe 11, the main return pipe 13 and the associated branch pipes 12, 14. In some cases, the buffer tank 79 may not be present in which case the heat exchangers 41 are connected directly to the main flow pipe 11 and the main return pipe 13. The heating system of the mushroom growing shed 3 shed comprises an indirect heater 9 which in turn comprises a radiator element 15 and a fan 17 for circulating hot air surrounding the fan. Hot water will flow from the heat exchanger 41 through the hot water pipe 75, optionally the buffer tank 79, the main flow pipe 11 and each of the branch flow lines 12 to the radiator elements 15. Cold water will flow back from the radiator elements through the branch return lines 14 and the main return pipe 13 to the buffer tank, from where cold water will be fed via the cold water pipe 77 into the heat exchangers 41.

In use, the mushroom production process commences with the delivery of mushroom compost to the mushroom production site. The mushroom compost comprises wood chips, sawdust, hay, grain, straw, manure, poultry litter, gypsum, paper, nut and seed hulls and other such substances inoculated with actively growing mushroom culture known as mycelium. The mushroom compost is dispersed in long trays and covered with peat. In general, the trays are arranged in mushroom beds 18 such that each mushroom bed 18 comprises three mushrooms trays vertically spaced apart from each other. The mushroom beds 18 are arranged in mushroom growing sheds 3, which are in general polytunnels.

The commercial mushroom growing cycle is in general six weeks long, during which time, three flushes of mushrooms will have been harvested from the mushroom compost. At this time the nutrients within the mushroom compost will have been consumed and the mushroom compost can now be referred to as spent mushroom compost. The mushroom growing sheds 3 are now steamed for 24 hours with steam at 150° C. and 6.8 bar so as to eliminate any bio-hazards present therein. Steaming the spent mushroom compost before it is removed from the mushroom growing sheds 3 ensures that there are no contaminants remaining in the spent mushroom compost that might infect the next batch of mushroom compost to arrive. When the spent mushroom compost has been successfully steamed, it is removed from the mushroom growing sheds 3 and transported to the fuel storage area 7 in the spent mushroom compost processing site 5 and from there to the wet fuel hopper 49 and onwards for combustion in the combustion apparatus of the energy conversion system 39 to supply heat to the mushroom growing sheds 3 for the next mushroom growing cycle.

Figure 10:
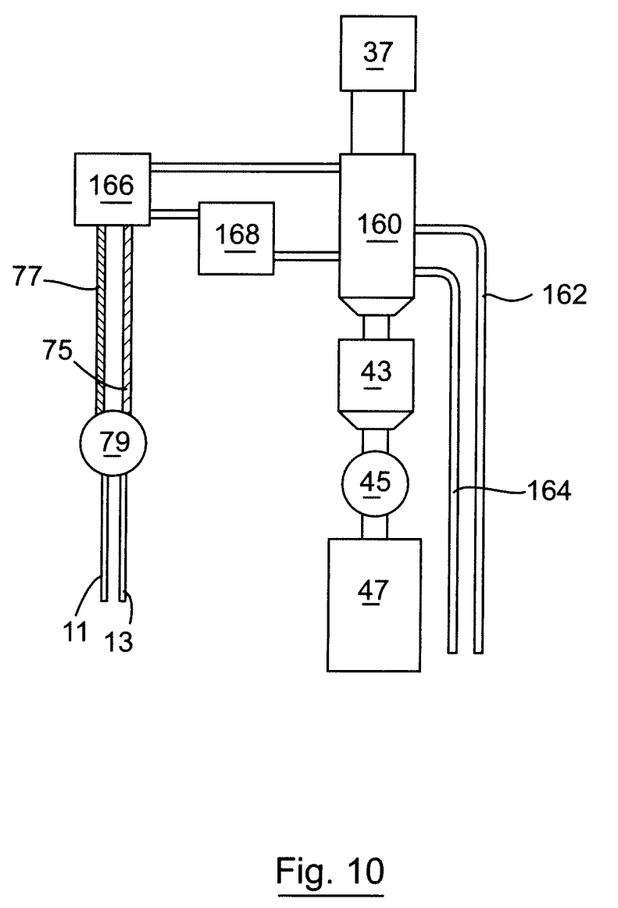
FIG. 10 is a plan view of a steam kit that may be used to implement the steps of the invention.

Referring now to FIG. 10, in which like parts have been given the same reference numerals as before, there is shown an alternative apparatus that may be used to harness the heat generated in the first fluidised bed unit 37. The apparatus comprises a steam boiler 160 wherein the exhaust gases pass over a water-in-tube heat exchanger arrangement (not shown) causing the water therein to boil and generating steam. Approximately half of this steam is then supplied to the mushroom growing sheds 3 for sterilisation purposes. The steam, which will be at a temperature of approximately 160° C., is supplied to the mushroom growing sheds via steam outflow pipe 162. Water for heating in the steam boiler is supplied thereto from a softened water supply (not shown) by a water supply pipe 164. The steam that is not sent to the mushroom growing sheds 3 is sent to a plate heat exchanger 166, which is used to supply hot water to heat the mushroom growing sheds 3. Steam entering the plate heat exchanger 166 is at approximately 160° C. and it will heat the water for the mushroom growing sheds 3 to approximately 90° C. This heated water will then pass to the buffer tank 79 for supply to the mushroom growing sheds 3 or in some cases, may be fed directly to the main flow line 11. The cooled steam which was used in the plate heat exchanger 166 to heat the water is now fed to a condensing tank 168 where it is condensed into water again, and subsequently fed back into the steam boiler. The exhaust gases pass to the standard air-air heat exchanger 43 from the steam boiler 160.

In the embodiments described, the heat from the burning of the spent mushroom compost is harnessed and used to heat the mushroom growing sheds. It is envisaged that the combustion of the spent mushroom compost could also be used to generate electricity. This electricity could be generated by providing a compressor to convert the hot water into steam, a turbine to be operated by the steam to use the steam to generate mechanical motion and an alternator coupled to the turbine to generate the electricity by converting the mechanical motion into electricity. The electricity thus generated could be used to power the fans thereby making the system even more self sufficient or alternatively the electricity could be used elsewhere in the installation or exported onto the grid. Additionally, it will be understood that the heat generated by the system may be used to generate electricity using an externally fired micro turbine, an organic rankine cycle and a sterling engine.

In the embodiments described above, the radiator element has been described as a radiator element that stores hot water. It will be understood that in an alternative embodiment of the invention, the radiator element could store a heated gas or other liquid or alternatively could be an electrical radiator element, such as an electrical coil. Current could be passed through the electrical radiator element to heat up the radiator element and the heat from the electrical radiator element could be used to heat the mushroom growing shed. A fan may be provided to draw air over the electrical radiator element and circulate the hot air in the shed. The electrical radiator element could be powered by electricity harnessed from the burning of the spent mushroom compost.

The fluidised bed unit is ideal for spent mushroom compost as it is able to handle spent mushroom compost having different levels of moisture content up to a point without significantly impairing performance. Furthermore, the design of fluidized burner described is compact and may be implemented in relatively small installations as a standalone machine. It is envisaged that the fluidised burner will be sized to handle of the order of one to ten tonnes of spent mushroom compost each day depending on the size of the installation and therefore will be sufficiently compact in construction to allow installation on a farm or mushroom production site.

It will be further understood that references to "thermally treating" the by-product fuel, or any grammatical variations thereof, should be interpreted as incinerating, burning, combusting, cremating, igniting and/or creating an oxidising reaction with the by-product fuel.

Reference has been made to the incineration of waste and/or by-products and the terms have been used largely interchangeably throughout the specification. For example, in some jurisdictions, poultry litter or mushroom compost is considered to be a by-product whereas in other jurisdictions it is considered to be a waste.

The energy conversion system may comprise a dryer ash cyclone unit located after the rotary drum dryer 51 to remove ash from the exhaust gases of the second fluidised bed unit.

It will be understood by the person skilled in the art that it is not necessary to have a pair of fluidised bed units in order to use the heat harnessed from the combustion of the spent mushroom compost fuel to dry the spent mushroom compost fuel. This will depend on the energy requirements of the mushroom growing site in question. In some case the output of one fluidised bed unit will be sufficient to supply the temperature control requirements of all the mushroom growing sheds on site and to dry the spent mushroom compost fuel. In other cases, further capacity will be required.

It will be understood that the energy conversion system described herein may include an absorption refrigeration system to allow the heat generated by the combustion in the fluidised bed unit to provide refrigeration to the mushroom growing sheds. The absorption refrigeration system may use the hot water provided by the heat transfer systems described herein. It will be further understood that the indirect heating systems described herein for use to heat the mushroom growing sheds may be adapted for use with the absorption refrigeration. Additionally, it will be understood that process of the invention may also make use of compressor refrigeration as required.

In the specification the terms 'comprise', 'comprises', 'comprised' and 'comprising' or any variation thereof and the terms 'include', 'includes', 'included' or 'including' or any variation thereof are considered to be totally interchangeable and they should all be afforded the widest possible interpretation.

The invention is not limited to the embodiment herein described, but may be varied in both construction and detail within the terms of the claims.

The invention claimed is:

1. A mushroom production process comprising:
   preparing a mushroom growing shed with at least one bed of mushroom compost;
   supplying heat to the mushroom growing shed;
   harvesting mushrooms;
   removing spent mushroom compost from the mushroom growing shed;
   wherein the process further comprises
   combusting the spent mushroom compost in an energy conversion system;
   harnessing heat generated by combusting the spent mushroom compost; and
   using the heat to control temperature of the mushroom growing shed.

2. A process as claimed in claim 1 in which combusting the spent mushroom compost comprises combusting the spent mushroom compost in a fluidised bed unit.

3. A process as claimed in claim 2 further comprising
   initially storing the spent mushroom compost in an open storage area adjacent the fluidized bed unit; and
   drawing air for supply to the fluidised bed unit from above the open storage area.

4. A process as claimed in claim 3 further comprising pre-heating the air for supply to the fluidised bed unit using the harnessed heat.

5. A process as claimed in claim 1 further comprising, subsequent to removing the spent mushroom compost from the mushroom growing shed, drying the spent mushroom compost using the harnessed heat.

6. A process as claimed in claim 1 in which combusting the spent mushroom compost comprises combusting the spent mushroom compost in a first fluidised bed unit and a second fluidised bed unit.

7. A process as claimed in claim 6 further comprising harnessing the heat generated by combusting the spent mushroom compost in the first fluidised bed unit; and using the harnessed heat to control the temperature of the mushroom growing shed.

8. A process as claimed in claim 1 in which harnessing the heat generated by the combustion of the spent mushroom compost comprises passing exhaust gases from the combustion of the spent mushroom compost through a heat exchanger.

9. A process as claimed in claim 1 in which harnessing the heat generated by the combustion of the spent mushroom compost comprises using the heat from the combustion of the spent mushroom compost to heat a liquid; and delivering the heated liquid to a radiator element located inside the mushroom growing shed.

10. A process as claimed in claim 9 further comprising drawing air over the radiator element and distributing the heated air inside the mushroom growing shed.

11. A process as claimed in claim 9 further comprising transferring the heated liquid to a buffer tank prior to delivery to the radiator element.

12. A process as claimed in claim 11 in which the process further comprises monitoring a temperature of the heated liquid in the buffer tank and maintaining the temperature of the heated liquid in the buffer tank at a desired temperature.

13. A process as claimed in claim 9 in which the heated liquid is heated to a temperature of the order of 85° C.

14. A process as claimed in claim 9 in which the heated liquid is heated to a temperature of the order of 100° C.

15. A process as claimed in claim 9 in which the heated liquid is heated to a temperature of the order of 160° C.

16. A process as claimed in claim 1 in which the spent mushroom compost from a previous mushroom growing cycle is burnt to provide heat to be harnessed for use in a current mushroom growing cycle in the mushroom growing shed.

17. A process as claimed in claim 1 further comprising, after removing the spent mushroom compost from the mushroom growing shed, delivering the spent mushroom compost to a remote fuel storage area for subsequent combustion.

18. A process as claimed in any preceding claim further comprising collecting ash from the combustion of the spent mushroom compost.

19. A mushroom production process comprising:
preparing a mushroom growing shed with at least one bed of mushroom compost;
supplying heat to the mushroom growing shed;
harvesting mushrooms;
removing spent mushroom compost from the mushroom growing shed;
characterised in that the process further comprises
combusting the spent mushroom compost in an energy conversion system;
harnessing heat generated by combusting the spent mushroom compost; and
using the heat to control temperature of the mushroom growing shed
wherein combusting the spent mushroom compost comprises combusting the spent mushroom compost in a fluidised bed unit.

20. A process as claimed in claim 19 further comprising
initially storing the spent mushroom compost in an open storage area adjacent the fluidized bed unit; and
drawing air for supply to the fluidised bed unit from above the open storage area.

21. A mushroom production process comprising:
preparing a mushroom growing shed with at least one bed of mushroom compost;
supplying heat to the mushroom growing shed;
harvesting mushrooms;
removing spent mushroom compost from the mushroom growing shed;
combusting the spent mushroom compost in an energy conversion system;
harnessing the heat generated by combusting the spent mushroom compost;
using the heat to control temperature of the mushroom growing shed
wherein combusting the spent mushroom compost comprises combusting the spent mushroom compost in a fluidised bed unit;
further initially storing spent mushroom compost in an open storage area adjacent the fluidised bed unit; and
drawing air for supply to the fluidised bed unit from above the open storage area.

* * * * *